United States Patent
Zecheru

(10) Patent No.: US 12,246,863 B2
(45) Date of Patent: Mar. 11, 2025

(54) ADAPTABLE LATTICE STRUCTURE FOR MULTI-MISSION DRONES

(71) Applicant: AIRBUS DEFENCE AND SPACE GMBH, Taufkirchen (DE)

(72) Inventor: Mihai Ioan Zecheru, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 18/282,846

(22) PCT Filed: Mar. 23, 2022

(86) PCT No.: PCT/EP2022/057640
§ 371 (c)(1),
(2) Date: Sep. 19, 2023

(87) PCT Pub. No.: WO2022/233496
PCT Pub. Date: Nov. 10, 2022

(65) Prior Publication Data
US 2024/0166383 A1    May 23, 2024

(30) Foreign Application Priority Data

May 3, 2021    (EP) .................................. 21171816
Jul. 5, 2021    (EP) .................................. 21183728

(51) Int. Cl.
*B64U 20/40*    (2023.01)
*B64U 20/70*    (2023.01)
(Continued)

(52) U.S. Cl.
CPC ............ *B64U 20/40* (2023.01); *B64U 20/70* (2023.01); *B33Y 80/00* (2014.12); *B64U 50/33* (2023.01);
(Continued)

(58) Field of Classification Search
CPC ........ B64U 20/40; B64U 20/70; B64U 50/33; B64U 2101/31; B64U 2101/55; B33Y 80/00; B64C 2211/00; B64C 1/08
See application file for complete search history.

(56) References Cited

U.S. PATENT DOCUMENTS

2010/0276538 A1* 11/2010 Helou, Jr. ................. B64C 1/00
244/118.1
2014/0374532 A1* 12/2014 Duffy ..................... G05D 1/104
244/2
(Continued)

FOREIGN PATENT DOCUMENTS

| CN | 109592026 | 9/2019 |
|---|---|---|
| WO | 2021119603 | 6/2021 |

OTHER PUBLICATIONS

European Patent Office, International Search Report and Written Opinion for International Patent Application No. PCT/EP2022/057640, May 25, 2022.
(Continued)

*Primary Examiner* — Valentina Xavier
(74) *Attorney, Agent, or Firm* — Williams Mullen; Thomas F. Bergert

(57) ABSTRACT

An adaptable lattice structure (110, 120, 130, 140) for a an Unmanned Aerial System, UAS, comprising: a plurality of lattice voxels (100, 102), wherein each lattice voxel (100, 102) comprises: a plurality of same shape elements (10, 12); wherein each same shape element (10, 12) comprises a plurality of connector elements (20), wherein the plurality of connector elements (20) are configured to temporarily couple a first same shape element (10) to at least a second same shape element (12); wherein the plurality of same shape elements (10, 12) are configured to be temporarily coupled so as to form a three dimensional lattice voxel (100); and wherein at least one of the connector elements (Continued)

(20) on a first lattice voxel (100) is configured to temporarily couple the first lattice voxel (100) to a second lattice voxel (102) after the formation of the first lattice voxel (100) and the second lattice voxel (102).

15 Claims, 11 Drawing Sheets

(51) Int. Cl.
      *B33Y 80/00*       (2015.01)
      *B64U 50/33*       (2023.01)
      *B64U 101/31*     (2023.01)
      *B64U 101/55*     (2023.01)

(52) U.S. Cl.
      CPC ...... *B64U 2101/31* (2023.01); *B64U 2101/55* (2023.01)

(56) References Cited

U.S. PATENT DOCUMENTS

| | | | | |
|---|---|---|---|---|
| 2016/0304217 | A1* | 10/2016 | Fisher | B60L 53/51 |
| 2016/0378108 | A1* | 12/2016 | Paczan | B64U 30/20 |
| | | | | 705/330 |
| 2017/0043883 | A1* | 2/2017 | Carney | E04B 1/35 |
| 2019/0127063 | A1* | 5/2019 | Gozluklu | B64C 37/02 |

OTHER PUBLICATIONS

European Patent Office, European Search Report for International Patent Application No. EP 21 171 816.8, Oct. 15, 2021.

\* cited by examiner

ADAPTABLE LATTICE STRUCTURE FOR MULTI-MISSION DRONES

CROSS-REFERENCE TO RELATED APPLICATIONS

This application is the U.S. national phase of international patent application PCT/EP2022/057640 and claims the benefit of European patent application No. 21171816.8 filed on May 3, 2021, and European patent application No. 21183728.1 filed on Jul. 5, 2021, the entire disclosures of which are incorporated herein by way of reference.

FIELD OF THE INVENTION

The present invention relates to an adaptable lattice structure for multi-mission drones and a method for making the adaptable lattice structure. The adaptable lattice structure is achieved via a plurality of voxels and allows for highly flexible drone designs as the size and shape of the drone can be easily altered dependent on the use of the drone.

BACKGROUND TO THE INVENTION

The usage of lattice structures in drones is known to the skilled person. However, these structures are monolithic and cannot be adapted. Furthermore, many structures are configurable prior to building but after the drone has been constructed, they are no longer customizable to the mission the drone is undertaking. This can therefore lead to a drone which is not suitable to the mission.

There is therefore a need for an adjustable, customizable drone structure which allows drones to be easily configured to the mission said drone is undertaking.

SUMMARY OF THE INVENTION

The invention is set out in the independent claims. Preferred embodiments of the invention are outlined in the dependent claims.

According to a first aspect, an adaptable lattice structure for an Unmanned Aerial System (UAS) is described. The structure comprises a plurality of lattice voxels. Each lattice voxel comprises a plurality of same shape elements. Each same shape element comprises a plurality of connector elements, wherein the plurality of connector elements are configured to temporarily couple a first same shape element to at least a second same shape element. The plurality of same shape elements are configured to be temporarily coupled so as to form a three dimensional lattice voxel. Furthermore, at least one of the connector elements on a first lattice voxel is configured to temporarily couple the first lattice voxel to a second lattice voxel after the formation of the first lattice voxel and the second lattice voxel.

The UAS described above may be any unmanned aerial system such as a drone, a fixed wing aircraft, a satellite, or any other UAS. Throughout the application, a drone is described but this is not limiting.

The adaptability of the lattice structure may allow for a highly customizable multi-mission drone structure. As a result, various parameters for the mission the drone is undertaking can be analyzed and then the drone can be constructed according to these parameters. These parameters may comprise range, sensors to be coupled to the drone, additional structural components such as landing gear, purpose of the mission, payload and any other suitable parameter. Additionally or alternatively, various parameters relating to the airframe of the multi-mission drone structure may be taken into account. These parameters may comprise range, tactical gear, tactical devices and tactical sensors to be coupled to the drone structure, sensors to be coupled to the drone structure, additional structural components such as landing gear, purpose of the mission, payload, propulsion, power supply weight, center of gravity or any other suitable parameter.

The structure requires a plurality of voxels due to the size of the voxels and to allow for adaptability of the lattice structure. Each of the voxels are preferably identical in size and shape but in some examples, may not be.

Each voxel comprises a plurality of same shape elements to allow for easy reproduction of said elements. This may allow for the shape of each voxel to be easily changed. For example, three voxels of six same shape elements each may be deconstructed and then reconstructed as two voxels of nine same shape elements each. This may further allow for an adjustable, customizable drone structure. The temporary coupling may be achieved via a nut and bolt, a screw, a hinge and a latch, or any other suitable coupling method. In some examples, the elements that comprise a voxel are not of the same shape.

Each same shape element comprises a plurality of connector elements, wherein the plurality of connector elements are configured to temporarily couple a first same shape element to at least a second same shape element. This may allow for a secure coupling between same shape elements within the same voxel thereby allowing a sturdy construction of the voxel and the lattice structure. The temporary coupling may be achieved via a nut and bolt, a screw, a hinge and a latch, or any other suitable coupling method. The same shape elements are temporarily coupleable to allow for easy reshaping of the voxels as described above.

The plurality of same shape elements are configured to be temporarily coupled so as to form a three dimensional lattice voxel. This three dimensional shape may be any shape which allows the drone to undertake its mission. The same shape elements are temporarily coupleable to allow for easy reshaping of the voxels as described above. In some examples, not all of the elements are the same shape.

At least one of the connector elements on a first lattice voxel is configured to temporarily couple the first lattice voxel to a second lattice voxel. This may allow for easy restructuring and customization of the adaptable lattice structure. The temporary coupling may be achieved via a nut and bolt, a screw, a hinge and a latch, or any other suitable coupling method.

In some examples, the same shape elements are squares, and wherein the same shape elements are configured to be temporarily coupled so as to form a tetradecahedron. The tetradecahedron may be a particularly advantageous shape as the 14 sides allow for a large amount of customization while maintaining a compact shape and a low weight of the voxels. The tertradecahedron shape may also allow for a plurality of triangles to be present in the lattice voxel which may further improve the structural strength of the voxels and thereby, the adaptable lattice structure. In some examples, the three dimensional shape may be a truncated octahedron. That is to say, the three dimensional shape is an octahedron with one of the vertices replaced by a flat surface. This may be particularly advantageous in structures where there is a large central voxel and the truncated octahedron voxels are smaller. This may allow for a particularly versatile lattice structure. The three dimensional shape may however be any suitable three dimensional shape.

In some examples, the plurality of connector elements on the first same shape element comprise a first at least one connector hole configured to be alignable with a second at least one connector hole on the second same shape element and/or the second lattice voxel. The alignability of the connector holes on the connector elements may allow for a secure temporary coupling of the same shape elements and/or voxels.

In some examples, one or more cable ties may be used to strengthen the coupling between the first same shape element and the second same shape element. This may allow for a simple coupling solution while still maintaining the strength and the security of the coupling.

In some examples, the one or more of the connector elements comprise a strengthening element. The strengthening element may be a metal bracket, a hinge and latch, a covering, or any other suitable strengthening element.

In some examples, there is no connector element. In these examples, the first and the second lattice voxels are coupled by a connector bracket. The connector bracket may be C-shaped, O-shaped, L-shaped or any other suitable shape which allows for the coupling of the first and second lattice voxels. This may result in a lattice structure which is particularly easy to assemble and dissemble.

The selection of the method of coupling, be it the connector element and/or the cable tie and/or the connector bracket, may be decided by the application of the lattice structure and its durability. If is to be considered that the hard landings are not excluded on remote areas or even on other planets for space explorations, then the coupling may be designed so that it is easy detachable using bare hands without the use of extra tools or jigs.

In some examples, at least one of the plurality of lattice voxels is configured to be temporarily coupled to an adaptable system for operation of the multi-mission drone, wherein the adaptable system comprises at least one of a battery, a propulsion system, a cargo and a payload. The adaptable system may allow for the drone to undertake many different types of mission such as surveillance, search and rescue, construction, or any other suitable mission. The battery may power the propulsion system and/or any electronic components in the system. The propulsion system may allow for the drone to fly. The propulsion system may comprise propellers, rotors, engines or any other suitable method of propulsion and the fuel needed to power the propulsion system. The cargo may be any suitable cargo for the mission the drone is undertaking. The payload may comprise a camera system which may comprise conventional cameras, infrared cameras, ultraviolet cameras, or any other suitable type of camera. Additionally or alternatively, any other suitable payloads may be part of the adaptable system. The adaptable system may comprise any suitable component that allows the drone to undertake its mission.

The multi-mission drone may, in some examples, comprise a flight controller which is embedded within one or more of the lattice voxels. The flight controller may be embedded in a space between one or more voxels. In some examples, the flight controller may be modular.

The design of the adaptable system may allow it to be replaced and/or reused on a new adaptable lattice structure design.

In some examples, each of the plurality of same shape elements and/or the plurality of lattice voxels are 3D-printed. The 3D-printing may allow for a simple construction of the elements and/or the voxels. In particular, the ability for the elements and/or voxels to be 3D-printed may allow for easy customization of the adaptable lattice structure via a computer program and may allow for simple construction of the lattice structure in remote areas as all is needed is a power supply for the printer. The 3D-printing may also allow for the same shape elements and/or the lattice voxels to be made of the same material or different materials. The material may be dependent the drone mission parameters. In cases where the payload of the drone is light, the material may be plastic. In cases where the payload is heavy, the material may be carbon fiber reinforced polymer (CFRP). However, any suitable material can be used, such as biodegradable materials. In some examples, different areas of the adjustable lattice may be made from different materials. For example, in a non-limiting example, the central hub of the drone may be made from voxels comprising CFRP whereas the arms of the drone may be made from voxels comprising plastics.

In some examples, each of the plurality of same shape elements and/or the plurality of lattice voxels are manufactured by 3D-printing Selective Laser Sintering technology and/or 3D-printing Fused Deposition Modelling technology and/or xFiber filament winding technology and/or wood/bone filament winding technology and/or carbon fiber reinforced plastic cutting technology via water and/or laser cutting and/or metal machining technology and/or injection molding technology and/or additive fusion technology.

In some examples, the first and second same shape elements and/or the first and second lattice voxels are configured to be temporarily coupled during the 3D-printing process. If the elements and/or voxels are temporarily coupled during the printing process, this may allow for a particularly quick deployment of the drone in emergency situations.

In some examples, at least one parameter of the plurality of same shape elements and/or the plurality of lattice voxels is configured to be changed before the manufacture of said plurality of same shape elements and/or plurality of lattice voxels, wherein the parameters comprise a lattice voxel size, a first thickness, a second thickness, a dimension of the plurality of connector elements, and a parameter of the plurality of connector elements. The parameter adjustment may be undertaken by a computer program or any other suitable method. The lattice voxel size may be defined as a maximum diameter of the constructed voxel. The first and second thicknesses may be defined as the thicknesses of one or more beams that make up a same shape element. The first and second thicknesses may be in different axes, for example, the first thickness may be in the x-axis and the second thickness in the y-axis. The first and second thicknesses may be dependent on the parameters of the mission the drone is undertaking. The beams may be of a rectangular cross section, a circular cross section, or any other suitable cross section. A dimension of the connector elements may be defined a size of the connector elements and/or a thickness of the connector elements and/or any other suitable parameter. A parameter of the connector elements may be defined as the number of connector holes within a connector element and/or a dimension of the connector holes and/or a material for the connector element and/or any other suitable parameter. The at least one parameter may also include a material from which to construct the elements and/or voxels. The parameters for each element and/or voxel may be identical or alternatively, may be different. The use of different materials may allow for the adaptable lattice structure to be more resilient or more flexible depending on the mission the drone is undertaking. Any of the above-mentioned parameters may be dependent on the parameters of the mission the drone is undertaking.

In some examples, one or more of the plurality of lattice voxels and/or the adaptable system comprises one or more sensors. The sensors may be communicatively coupled to a computer either onboard in the adaptable system or on the ground, wherein the computer comprises an AI algorithm. The one or more sensors may allow for the lattice voxel parameters to be set automatically by the UAS design itself. This may allow for the operator of the drone to receive real-time information about the state of the drone and allow the operator to make adjustments to the drone when it has landed in order to optimize the drone for the mission. In some examples, the AI algorithm suggests adjustments to be made to the adaptable lattice structure. The sensors may be configured to sense G-Force, strain, battery level or any other suitable parameter.

In a non-limiting example, if the drone is used in a remote application or in a conflict area, the drone may be dismantled while the plurality of sensors and the adaptable system are maintained. Based on the sensor observations, a smaller observation drone can be modified and constructed on the field.

In a second non-limiting example, the drone may be used for subscale flight testing. In this scenario, new sensors configured to sense different parameters may be easily tested in flight and/or used on the adaptable system in order to impact test payloads by dropping them. This may result in a drone which can be used as a testing platform and/or as an extremely flexible concept.

In some examples, the lattice structure may be constructed during flight. In this examples, the construction of the lattice structure may be undertaken by a bigger UAS such as, for example, a mother drone. Construction during flight may be undertaken after the mother drone has been dropped out from a plane or other vehicle which may itself be flying in formation. This may allow for the mass of the lattice structure to be distributed over a larger area thereby leading an increased ability to avoid detection by RADAR or other defense means. Furthermore, due to distributed mass over the lattice structure, should the structure collide with another vehicle, the energy of impact may not be concentrated at a small point but distributed across a larger area. This may allow for a safer design. Additionally, should structures be constructed and/or coupled to each other during flight, an intelligent power distribution system may be incorporated into the system which may result in an extended range of the multi-mission drones. Moreover, a shared sensor network for Internet connection may also be considered and/or the multi-mission drone may be used as a beacon and/or a transmission/reception antenna. Due to the high amount of linear elements in the lattice structure, the structure may result in a low observability UAS design which is less visible to, for example, RADAR.

In some examples, one or more of the plurality of voxels are adaptor voxels. The adaptor voxel may be similar to the lattice voxels described above but have a bespoke three dimensional polygon design. The adaptor voxel may comprise elements which are not of the same shape. The adaptor voxel may allow for voxels of differing sizes to be coupled to each other thereby allowing for a very customizable and flexible lattice structure.

In a non-limiting example, an adaptable lattice structure may comprise a 100 mm diameter lattice voxel and a 60 mm diameter lattice voxel. The adaptor voxel may be designed in such a way so the diameter of the adaptor voxel at a first side is 100 mm and the diameter at a second side is 60 mm. The adaptor voxel may then be coupled to the 100 mm lattice voxel and the 60 mm lattice voxel simultaneously. The diameter of the voxels and the order of coupling may depend on the application of the multi-mission drone and/or the strength needed for the structure due to environmental and/or mission parameters.

In some examples, the adaptor voxel and the elements used to make the adaptor voxel are constructed in the same manner as the other lattice voxels described in this application. In some examples, the adaptor voxel and the elements used to make the adaptor voxel are made of the same materials as the other lattice voxels described in this application. In some examples, the design process of the adaptor voxel and the elements used to make the adaptor voxel is the same as described in relation to the other lattice voxels described in this application. In some examples, the shape of the elements which couple a first voxel to a second voxel are not the same. For example, in non-limiting examples, the first voxel may comprise a quadratic element and the second voxel may comprise a circular element/a triangular element/a hexagonal element/an element with a bespoke shape. This may allow for greater flexibility of the lattice structure and a more customizable lattice structure. The shapes of the elements and the shape of the elements used to couple the first voxel to the second voxel may depend on the application and/or mission requirements.

In some examples, the first same shape element and/or the second same shape element comprises a kink in one of more of the beams of the said first same shape element and/or second same shape element. The kink may mean that at least one beam is not straight along its entire length. The kink may be a single change of direction of the beam or alternatively, a plurality of changes of direction of the beam. The kink may be a V-shape, a U-shape, a W-shape or any other suitable shape. The kink may be placed at any suitable location along the length of the beam such as, for example, the center of the beam or offset from the center of the beam. There may be a plurality of kinks within a single beam. A kinked beam may allow for a more flexible voxel and thereby, a more flexible structure therefore improving the versatility of the lattice structure. Additionally or alternatively, a kinked beam in a same shape element may improve the strength of the voxel, thereby leading to a more robust lattice structure.

In some examples, the first same shape element and/or the second same shape element comprises an adapter element configured to hold an external element. The external element may be, for example, a tube, a rod, an antenna, a motor or any other suitable external element. The external element may be held in place by a circular adapter element in the center of the same shape element. The circular adapter element may be of any suitable diameter which holds the external element in place. The circular adapter element may be located in the center of the same shape element or alternatively, may be offset from the center of the same shape element. Alternatively, the adapter element may be square, rectangular, triangular or any other suitable shape. There may be a plurality of adapter elements within a single same shape element. This may result in a particularly versatile lattice structure. In some examples, the first and/or second same shape element comprises both a kink and an adapter element.

In some examples, the adapter element comprises an anti-rotation element configured to hold the external element in place and prevent the rotation of the external element. The anti-rotation element may be a stud, a latch or any other element suitable to prevent the rotation of the external element. There may be a single anti-rotation element configured to prevent the external element from rotating in a single rotational direction or alternatively, there may be a plurality of anti-rotation elements configured to prevent the external element from rotating in a plurality of rotational directions. This may result in a secure lattice structure.

In some examples, the first same shape element and/or the second same shape element comprises a Voronoi tessellation. The definition of a Voronoi tessellation is known to the skilled person. In some examples, the Voronoi tessellation is a centroidal Voronoi tessellation. This may lead to a particularly strong same shape element and therefore, a structurally sound voxel.

In some examples, the first same shape element and/or the second same shape element comprises any suitable geometrical pattern which is generated manually or mathematically. In this example, the geometrical pattern may be produced by using generative design tools which may allow for easy implementation and high flexibility of design. Furthermore, if a fractal pattern is used, this may lead to a particularly lightweight design.

If the same shape elements and/or the lattice voxels are constructed via 3D printing, an electrical conduits may be introduced into the manufacturing of the same shape elements and/or the lattice voxel. In particular, the lattice structure may be fitted with "health monitoring" sensors and elements configured to monitor the structural intergrity of the structure and/or the health of the sensors and components coupled to the lattice structure. Furthermore, the lattice structure may be partially or completely constructed from smart materials or polymers like "shape memory materials" that change their form depending on the temperature or other physical/environmental characteristics. In some examples, the flight pattern of a multi-mission drone using the described lattice structure may be adapted depending the flight altitude. Additionally or alternatively, the lattice structure may comprise materials that change/adapt their color can be camouflaged into the environment that the multi-mission drone operates in.

In some examples, the first and/or the second lattice voxels comprise a triangular element. The triangular element may be coupled to the same shape elements via any method described above. There may be any number of triangular elements in a lattice voxel. The triangular element may allow for a highly flexible lattice structure design, as the shape of the lattice voxels may be highly customizable.

According to a second aspect, a method for constructing an adaptable lattice structure for an Unmanned Aerial System (UAS) is described. The adaptable lattice structure comprises a plurality of lattice voxels, wherein each lattice voxel comprises a plurality of same shape elements, and wherein each same shape element comprises a plurality of connector elements. The method comprises temporarily coupling a first connector element of a first same shape element to at least a second connector element of at least a second same shape element. The method further comprises temporarily coupling the plurality of same shape elements so as to form a three dimensional lattice voxel. The method further comprises temporarily coupling at least one of the plurality of the connector elements on a first lattice voxel to at least one of the plurality of the connector elements a second lattice voxel after the formation of the first lattice voxel and the second lattice voxel.

The structure requires a plurality of voxels due to the size of the voxels. Each of the voxels are preferably identical in size and shape but in some examples, may not be.

Each voxel comprises a plurality of same shape elements to allow for easy reproduction of said elements. This may allow for the shape of each voxel to be easily changed. For example, three voxels of six same shape elements each may be deconstructed and then reconstructed as two voxels of nine same shape elements each. This may further allow for an adjustable, customizable drone structure. In some examples, not all of the elements are of the same shape.

Each same shape element comprises a plurality of connector elements, wherein the plurality of connector elements. These connector elements may allow for a secure coupling between same shape elements within the same voxel thereby allowing a sturdy construction of the voxel and the lattice structure. The temporary coupling may be achieved via a nut and bolt, a screw, a hinge and a latch, or any other suitable method. The same shape elements are temporarily coupleable to allow for easy reshaping of the voxels as described above. The construction of the connector elements may be dependent on the parameters of the mission that the drone is undertaking and/or the parameters of the same shape elements and/or the parameters of the lattice voxels. In some examples, each of the connector elements on a same shape element is the same. Alternatively, the connector elements may be different i.e. two or more connector element constructions.

The temporary coupling of same shape elements to each other may allow for the easy reshaping of the voxels as described above. The temporary coupling may be achieved via a nut and bolt, a screw, a hinge and a latch, or any other suitable method.

The temporary coupling of the plurality of same shape elements so as to form a three dimensional lattice voxel may allow for easy reshaping of the voxels as described above. This three dimensional shape may be any shape which allows the drone to undertake its mission.

The temporary coupling of the first lattice voxel and the second lattice voxel via the connector elements may allow for easy restructuring and customization of the adaptable lattice structure. The temporary coupling may be achieved via a nut and bolt, a screw, a hinge and a latch, or any other suitable method.

In some examples, the same shape elements are squares, and wherein the method further comprises temporarily coupling the same shape elements so as to form a tetradecahedron. The tetradecahedron may be a particularly advantageous shape as the 14 sides allow for a large amount of customization while maintaining a compact shape and a low weight of the voxels. The tertradecahedron shape may also allow for a plurality of triangles to be present in the lattice voxel which may further improve the structural strength of the voxels and thereby, the adaptable lattice structure. The three dimensional shape may however be any suitable three dimensional shape according to the mission parameters of the drone and the adaptable lattice structure characteristics.

In some examples, the plurality of connector elements on the first same shape element comprise a first at least one connector hole, and wherein the method further comprises aligning a second at least one connector hole on the second same shape element and/or the second lattice voxel with the first at least one connector hole. The alignability of the connector holes on the connector elements may allow for a secure temporary coupling of the same shape elements and/or voxels.

In some examples, the method further comprises temporarily coupling at least one of the plurality of lattice voxels to an adaptable system for operation of the multi-mission drone, wherein the adaptable system comprises at least one of a battery, a propulsion system, a cargo and a payload. The adaptable system may allow for the drone to undertake many different types of mission such as surveillance, search and rescue, construction, or any other suitable mission. The battery may power the propulsion system and/or any electronic components in the system. The propulsion system may allow for the drone to fly. The propulsion system may comprise propellers, rotors, engines or any other suitable method of propulsion and the fuel needed to power the propulsion system. The cargo may be any suitable cargo for the mission the drone is undertaking. The payload may comprise a camera system may comprise conventional cameras, infrared cameras, ultraviolet cameras, or any other suitable type of camera. Additionally or alternatively, any other suitable payloads may be part of the adaptable system.

In some examples, the method further comprises 3D-printing each of the plurality of same shape elements and/or the plurality of lattice voxels. The 3D-printing may allow for a simple construction of the elements and/or the voxels. In particular, the ability for the elements and/or voxels to be 3D-printed may allow for easy customization of the adaptable lattice structure via a computer program and may allow for simple construction of the lattice structure in remote areas as all is needed is a power supply for the printer.

In some examples, the method further comprises temporarily coupling the first and second same shape elements and/or the first and second lattice voxels during the 3D-printing process. If the elements and/or voxels are temporarily coupled during the printing process, this may allow for a particularly quick deployment of the drone in emergency situations.

In some examples, the method further comprises changing at least one parameter of the plurality of same shape elements and/or the plurality of lattice voxels before the manufacture of said plurality of same shape elements and/or plurality of lattice voxels, wherein the parameters comprise a lattice voxel size, a first thickness, a second thickness, a dimension of the plurality of connector elements and a parameter of the plurality of connector elements. The parameter adjustment may be undertaken by a computer program or any other suitable method. The lattice voxel size may be defined as a maximum diameter of the constructed voxel. A dimension of the connector elements may be defined a size of the connector elements and/or a thickness of the connector elements and/or any other suitable parameter. A parameter of the connector elements may be defined as the number of connector holes within a connector element and/or a dimension of the connector holes and/or a material for the connector element and/or any other suitable parameter. The at least one parameter may also include a material from which to construct the elements and/or voxels. The parameters for each element and/or voxel may be identical or alternatively, may be different.

According to a third aspect, we describe a use of the adaptable lattice structure for an Unmanned Aerial System and/or a use of the Unmanned Aerial System and/or a use of the method for constructing an adaptable lattice structure for an Unmanned Aerial System.

As described above, the adaptable lattice structure and the method for constructing the adaptable lattice structure may allow for an adjustable, customizable drone structure which allows drones to be easily configured to the mission said drone is undertaking. The usage of the adaptable lattice structure and/or the method may include any or all of the benefits as described in the first and second aspects above.

According to a fourth aspect, we describe an Unmanned Aerial System comprising the adaptable lattice structure. This may allow for an adjustable, customizable multi-mission drone which is easily configured to the mission said drone is undertaking. The multi-mission drone using the adaptable lattice structure may include any or all of the benefits of the usage of the adaptable lattice structure as described above in relation to the first to third aspects above.

The above described aspects may, in some examples, be part of the design life cycle of the drone. The life cycle may comprise the steps of:

i) Defining the mission according to the mission parameters;
ii) Determining the performance requirements of the drone according to the mission parameters;
iii) Determining the diameter of the lattice voxels needed for the drone;
iv) Determining the design of the adaptable lattice structure;
v) Finalizing the design; and
vi) Constructing the adaptable lattice structure.

In some examples, not all of these steps are required. In some examples, the steps may be in a different order. In some examples, some of the steps happen simultaneously.

It is clear to a person skilled in the art that the statements set forth herein may be implemented under use of hardware circuits, software means, or a combination thereof. The software means can be related to programmed microprocessors or a general computer, an ASIC (Application Specific Integrated Circuit) and/or DSPs (Digital Signal Processors). For example, the processing unit may be implemented at least partially as a computer, a logical circuit, an FPGA (Field Programmable Gate Array), a processor (for example, a microprocessor, microcontroller ($\mu$C) or an array processor)/a core/a CPU (Central Processing Unit), an FPU (Floating Point Unit), NPU (Numeric Processing Unit), an ALU (Arithmetic Logical Unit), a Coprocessor (further microprocessor for supporting a main processor (CPU)), a GPGPU (General Purpose Computation on Graphics Processing Unit), a multi-core processor (for parallel computing, such as simultaneously performing arithmetic operations on multiple main processor(s) and/or graphical processor(s)) or a DSP.

It is further clear to the person skilled in the art that even if the herein-described details will be described in terms of a method, these details may also be implemented or realized in a suitable device, a computer processor or a memory connected to a processor, wherein the memory can be provided with one or more programs that perform the method, when executed by the processor. Therefore, methods like swapping and paging can be deployed.

Even if some of the aspects described above have been described in reference to the arrangement, these aspects may also apply to the method and vice versa.

BRIEF DESCRIPTION OF THE DRAWINGS

These and other aspects of the invention will now be further described, by way of example only, with reference to the accompanying figures, wherein like reference numerals refer to like parts, and in which:

FIG. 8 shows a perspective view of a method of coupling a plurality of lattice voxels according to an embodiment described herein;

DETAILED DESCRIPTION OF THE PREFERRED EMBODIMENTS

Figure 1A:
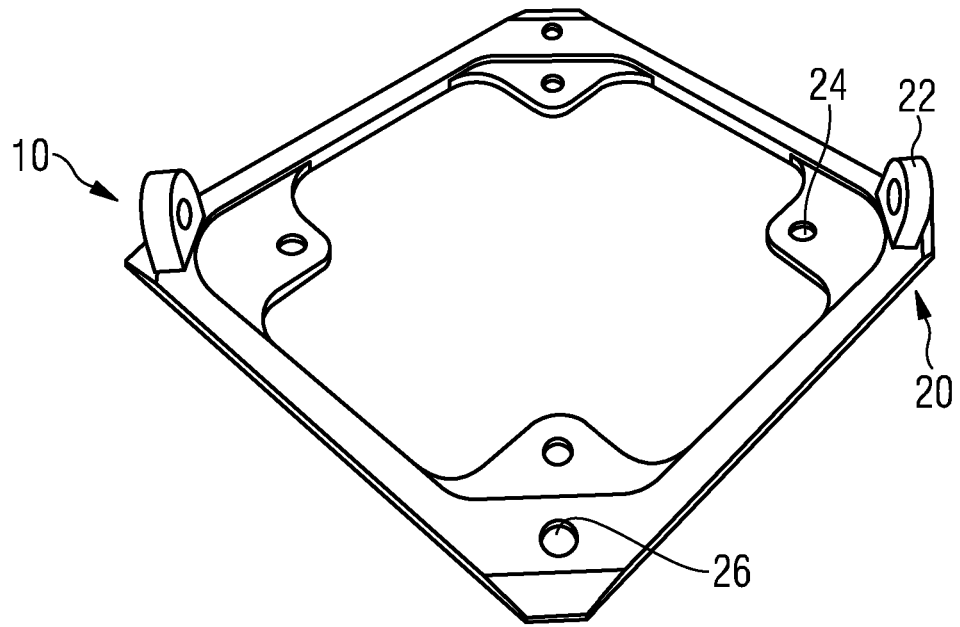
FIGS. 1*a* and *b* show perspective views of a same shape element according to an embodiment described herein.

FIGS. 1a and b show perspective views of a same shape element according to an embodiment described herein.

FIGS. 1a and b show a same shape element 10. The same shape element 10 may be of any suitable shape. The square same shape element 10 comprises a plurality of connector elements 20. There are three main types of connector hole 22, 24, 26 that make up the connector elements 20. In this embodiment, there is a connector element 20 at each corner of the same shape element 10. In some embodiments, there is a connector element 20 at only select corners and/or not located in a corner, i.e. between corners.

The first type of connector hole 22 is in a direction substantially parallel to the main plane of the same shape element 20. The first type of connector hole 22 may be located in a section of the same shape element 10 which projects from the main plane of the same shape element 10. The first type of connector hole 22 may allow for the same shape element 10 to be coupled to other same shape elements 10 and/or lattice voxels (see FIG. 3) as will be described below.

The second type of connector hole 24 is in a direction substantially perpendicular to the main plane of the same shape element 10. The second type of connector hole may be located in a section of the same shape element 10 which projects towards the center of the same shape element 10. The second type of connector hole 24 may allow for the same shape element 10 to be coupled to other same shape elements 10 and/or lattice voxels.

The third type of connector hole 26 is in a direction substantially perpendicular to the main plane of the same shape element 10. The third type of connector hole 26 may be located in the main frame of the same shape element 10 i.e. not on any section which projects from the same shape element 10. This may allow for a particularly strong coupling of the same shape element 10 to other same shape elements 10 and/or lattice voxels as the thickness of the main frame of the same shape element may be more than of the projections on which the first 22 and second 24 types of connector hole are located.

A connector element 20 can have any combination of the three types of connector hole 22, 24, 26 described above. Although the connector holes 22, 24, 26 are described as being parallel or perpendicular to the main plane of the same shape element 10, the connector holes 22, 24, 26 may be of any suitable orientation in relation to the main plane.

The main frame of the same shape element 10 may be of any thickness or size which allows for the three dimensional voxel to be constructed.

In some embodiments not shown, the same shape element 10 further comprises a strengthening element. This strengthening element may be coupled to opposite beams of the same shape element 10 and allow for a stronger construction of the same shape element 10. The strengthening element may be comprised of the same material as the same shape element 10 or a different material.

Figure 2:
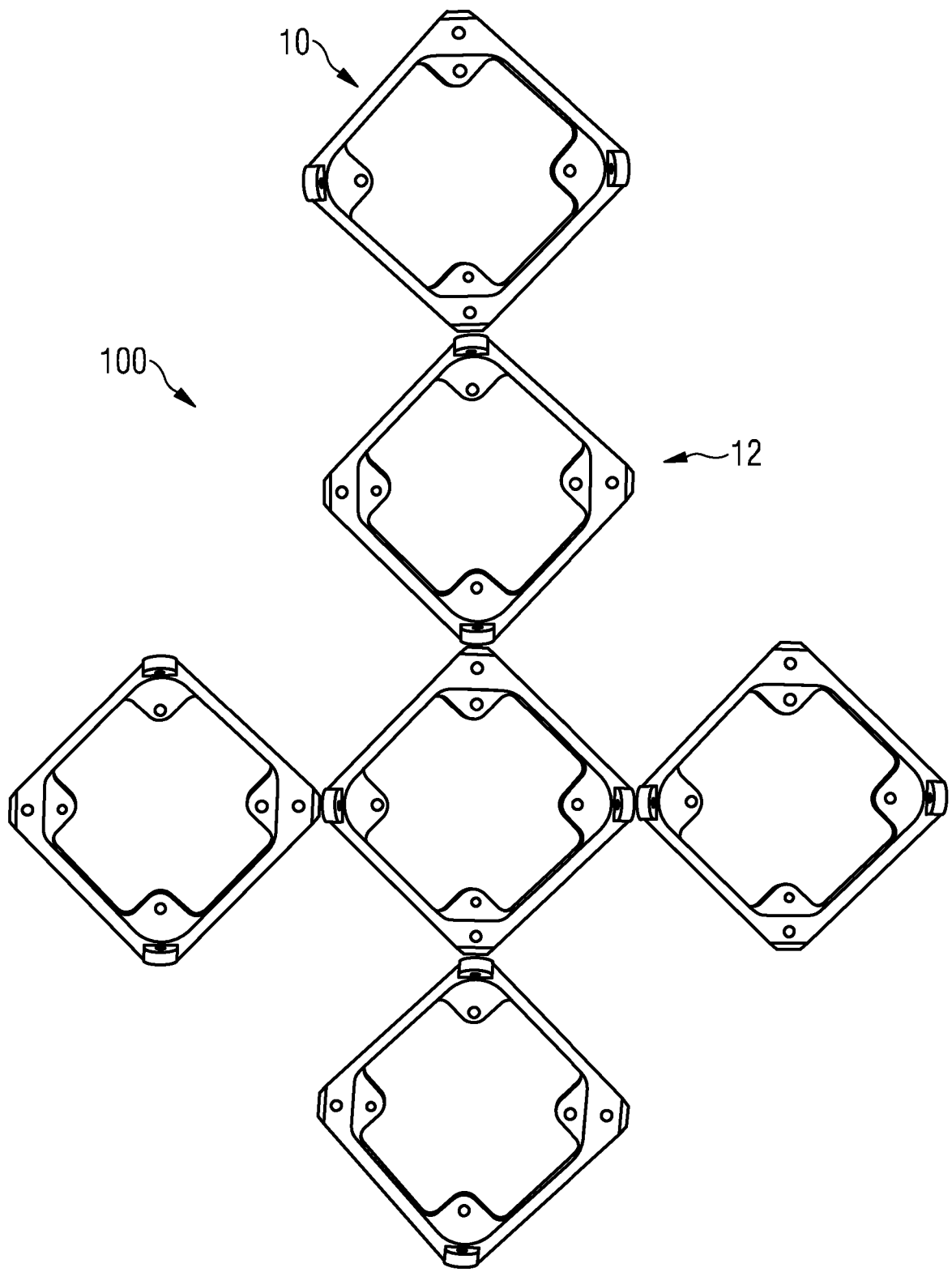
FIG. 2 shows a perspective view of a net of a three dimensional lattice voxel according to an embodiment as described herein.

FIG. 2 shows a perspective view of a net of a three dimensional lattice voxel according to an embodiment as described herein.

The net for the three dimensional lattice voxel 100 in this embodiment comprises six same shape elements 10, 12. The net may alternatively comprise any number of same shape elements 10, 12 according to the size of the lattice voxel 100 and the parameters of the mission which the drone will be undertaking. The connector holes 22, 24, 26 of each same shape element 10, 12 are aligned so as to form a secure connection between the same shape elements.

Figure 3A:
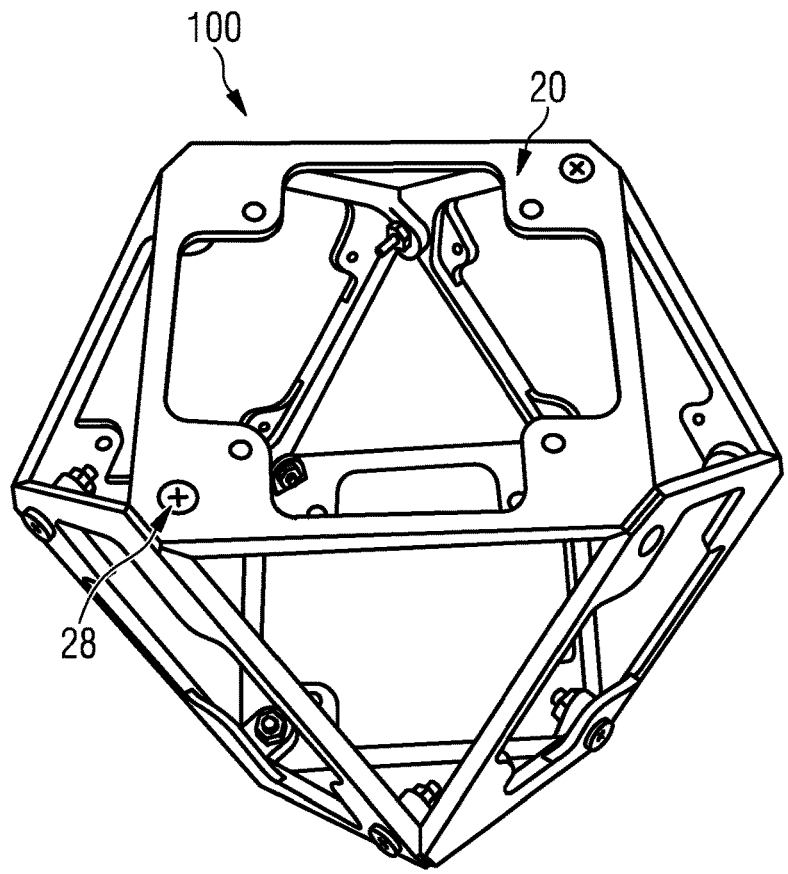
FIGS. 3*a* and *b* show perspective views of a constructed three dimensional lattice voxel according to an embodiment as described herein.

FIGS. 3a and b show perspective views of a constructed three dimensional lattice voxel according to an embodiment as described herein.

In FIG. 3a, it can be seen that the completed lattice voxel 100 comprises six of the same shape elements 10, 12. In this embodiment, the lattice voxel 100 forms a tetradecahedron but the lattice voxel 100 may be of any three dimensional shape. One half of the lattice voxel 100 is formed by coupling three of the same shape elements 10, 12 via the connector elements 20 on each respective same shape element 10. The same shape elements 10, 12 are coupled in such a way so as to form a triangle between each of the same shape elements 10, 12 and a further triangle at the top of the half. The two halves of the lattice voxel 100 are then coupled together. Alternatively, the lattice voxel 100 may be constructed via any suitable method.

In some embodiments, the same shape elements 10, 12 may be flush to each other and there may be no gap between the same shape elements 10, 12. In some embodiments, there is a mixture of flush same shape elements 10, 12 and same shape elements 10, 12 with gaps between them. In some embodiments, the gap is not triangular in shape but can be of any suitable shape.

In this embodiment, the same shape elements 10, 12 of the lattice voxel 100 are coupled via screws 28 and bolts. These are preferably M2 screws and bolts but may be any type of screw or bolt. The couplings may be made additionally or alternatively by any suitable coupling means.

Figure 3B:
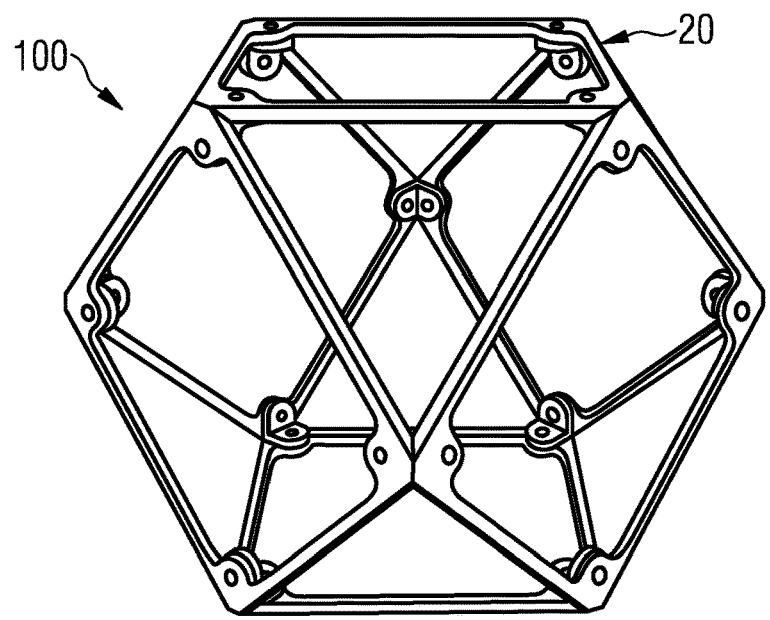

FIG. 3b shows a further variation of the constructed lattice voxel 100. In this embodiment, the same shape elements 10, 12 of the lattice voxel 100 are constructed via water-cutting carbon fiber reinforced plastic technology. Alternatively, the same shape elements 10, 12 may be constructed via any other method described in the present disclosure. In this embodiment, the connector elements 20 are made from metal. This may allow for a particularly strong connector element 20. Alternatively, the connector elements 20 may only partially comprise metal or not comprise metal at all. The connector elements 20 may be added after construction of the net of the lattice voxel 100 and/or also be added during construction of a same shape element 10, 12 and/or the construction of the net of the lattice voxel 100.

Figure 4A:
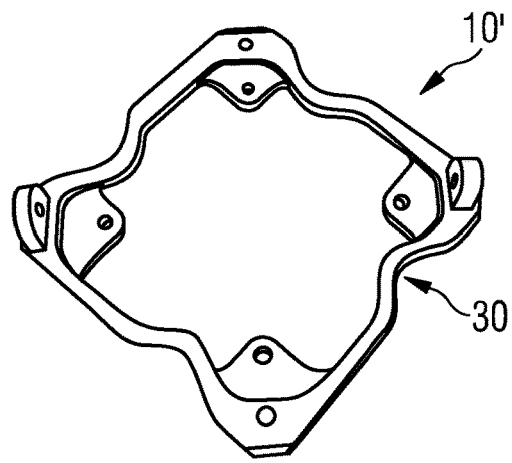
FIGS. 4*a, b* and *c* show perspective views of a plurality of same shape elements according to an embodiment described herein.

FIGS. 4a, b and c show perspective views of a plurality of same shape elements according to an embodiment described herein.

As an alternative to the same shape elements 10, 12 described above, one or more of the same shape elements 10, 12 in a lattice voxel 100, 102 may comprise additional features.

In FIG. 4a, the same shape element 10' comprises a kink 30. A kink 30 is located in each beam of the same shape element 10' and each kink 30 comprises the same shape, that is to say, a V-shape and is of the same dimensions. Each kink 30 is also offset from the center of its respective beam by the same distance. This may allow for a particularly flexible same shape element 10' and/or a particularly strong same shape element 10'. In some embodiments, the kink is W-shaped or U-shaped. In some embodiments, not all beams in the same shape element 10' comprise a kink. In some embodiments, the kinks 30 are located at the center of their respective beams. In some embodiments, a beam comprises multiple kinks 30. In some embodiments, the kinks 30 may be placed at different locations within each beam. In some embodiments, not all kinks 30 are identical, for example, one beam may have a V-shaped kink 30 while another beam has a W-shaped kink 30.

Figure 4B:
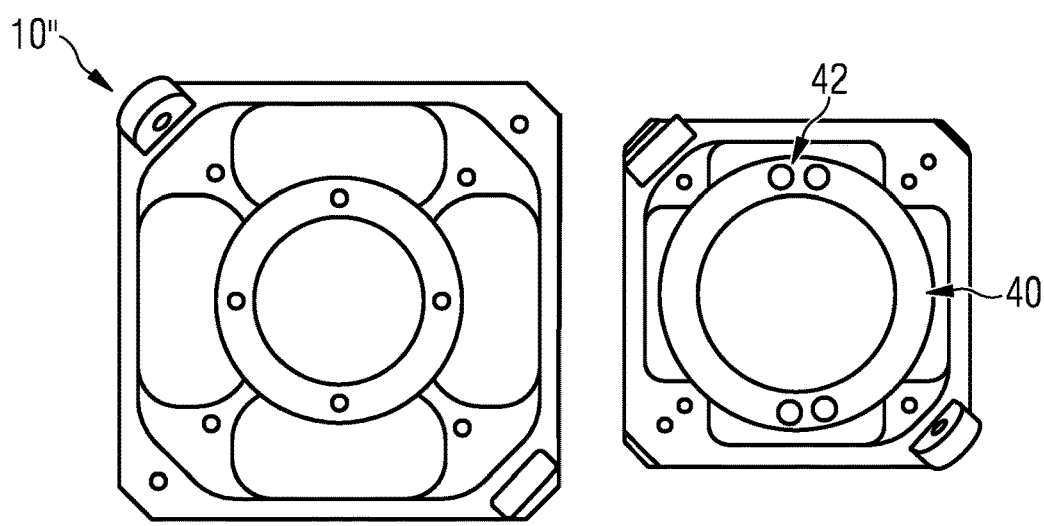

In FIG. 4b, the same shape element 10" comprises an adapter element 40. The adapter element 40 is located in the center of the same shape element 10" and is configured to hold an external element. The external element may be a tube, a rod, an antenna, a motor or any other suitable element. In this embodiment, the adapter element 40 is a circle but it may alternatively be a triangle, a square, a rectangle or any other suitable shape. The adapter element 40 is a diameter of 22 mm in this embodiment but it may be altered depending on the external element to be held by the adapter element 40. In this embodiment, the adapter element 40 further comprises a plurality of anti-rotation elements 42. The anti-rotation elements 42 are protrusions which extend from the adapter element 40 and are configured to hold the external element in place during the operation of the multi-mission drone. The anti-rotation elements 42 may additionally or alternatively be latches, brackets or any other suitable elements which prevents the rotation of the external element. In some embodiments, there are no anti-rotation elements 42. In some embodiments, there is a plurality of adapter elements 40 within a single same shape element 10". The adapter element 40 may allow for a versatile lattice structure.

Figure 4C:
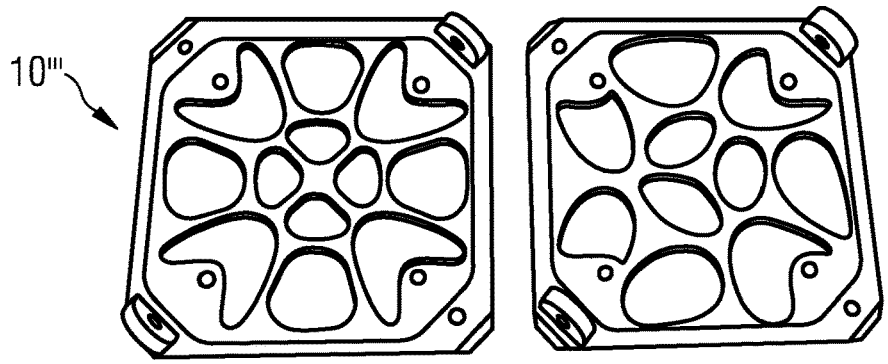

In some FIG. 4c, the same shape element 10''' comprises a Voronoi tessellation. Voronoi tessellations are known to the skilled person. The Voronoi tessellation may be any suitable pattern which allows for the construction of the lattice voxel 100, 102. A Voronoi tessellation may allow for a structurally sound lattice voxel 100, 102.

Figure 5A:
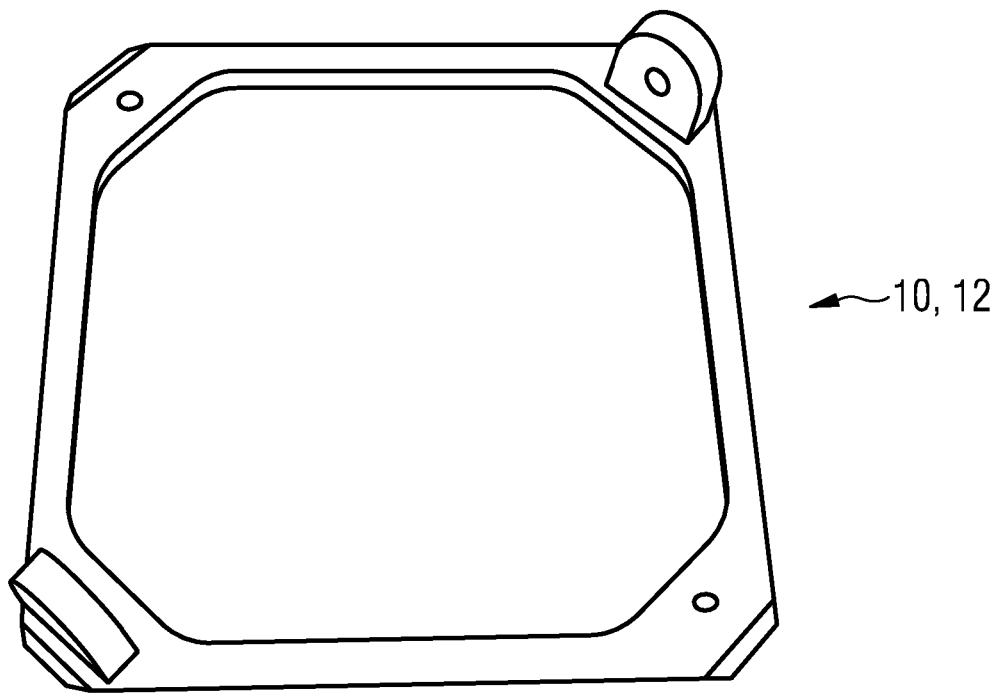
FIGS. 5a and b show perspective views of a method of coupling a plurality of lattice voxels according to an embodiment described herein.

FIGS. 5a and b show a perspective view of a method of coupling a plurality of lattice voxels according to an embodiment described herein.

Figure 1B:
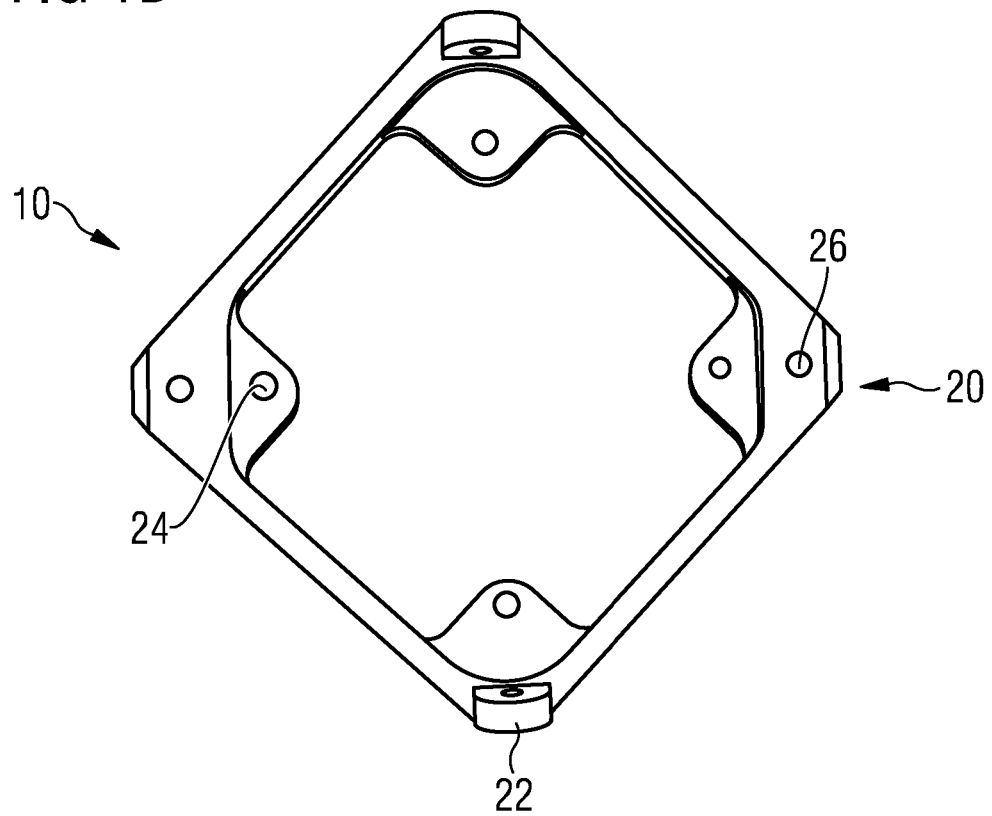

In the embodiment of FIGS. 5a and b, there are no connector elements 20 on the same shape elements 10, 12 as described above in relation to FIGS. 1a and 1b. In this embodiment, the lattice voxels 100, 102 are coupled to each other via connector brackets 50. The connector brackets 50 in this embodiment are C-shaped but may alternatively be O-shaped, L-shaped or any other suitable shape which allows the lattice voxels 100, 102 to be coupled to one another. The connector brackets 50 may comprise plastic and/or metal and/or carbon fiber and/or any other suitable material. In the case of C-shaped connector brackets 50, the connector brackets 50 are configured to be paced over a beam of a first lattice voxel 100 and then snap on to a beam of a second lattice voxel 102 in order to create a secure coupling between the lattice voxels 100, 102. This may result in a lattice structure which is particularly easy to assemble and dissemble. In some embodiments, there are both connector elements 20 and connector brackets 50 in order to create a particularly secure coupling between the lattice voxels 100, 102. The connector brackets 50 may be integral to one of the lattice voxels 100, 102 or alternatively, may be a separate part which can be added after the construction of the lattice voxels 100, 102.

FIGS. 6a-f show perspective views of a plurality of lattice voxels according to an embodiment described herein.

Figure 6A:
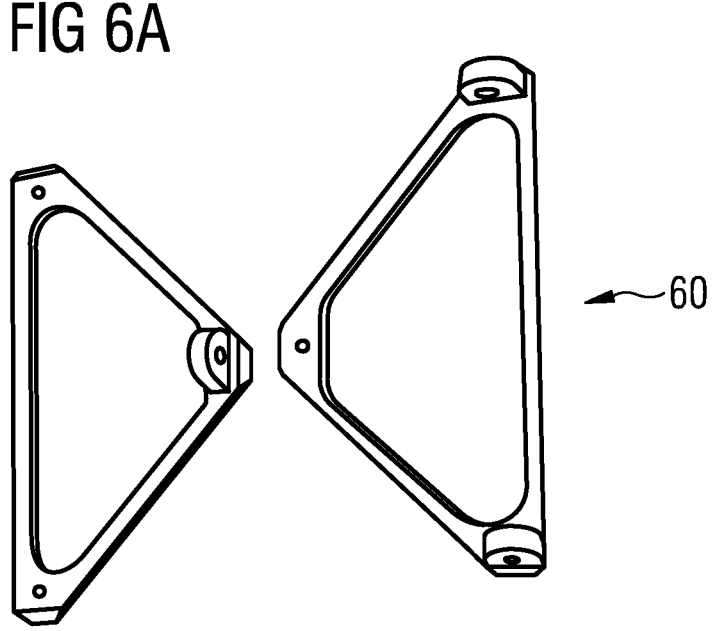
FIGS. 6a-f show perspective views of a plurality of lattice voxels according to an embodiment described herein.

In some embodiments, the lattice voxels 100, 102 further comprise a triangular element 60, as shown in FIG. 6a. The triangular elements 60 may be constructed in substantially the same way as the same shape elements 10, 12 described above in relation to FIGS. 1a and 1b. The triangular elements 60 may comprise a plurality of first type of connector holes 22, a singular first type of connector hole 22 or no first type of connector holes 22. If a lattice voxel 100, 102 has a triangular element, it may allow for a highly flexible lattice structure design as the shape of the lattice voxels may be highly customizable.

Figure 6B:
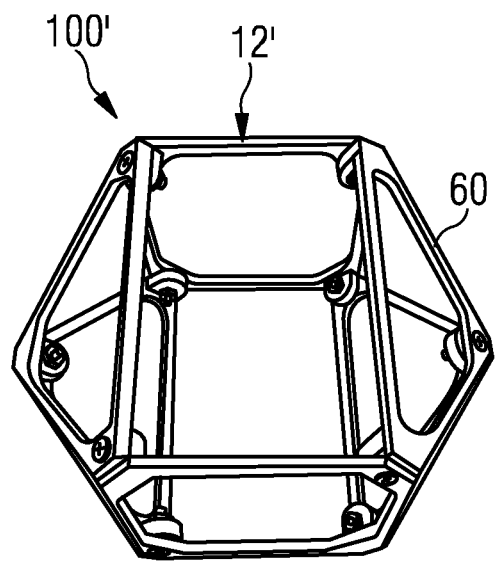
Figure 6C:
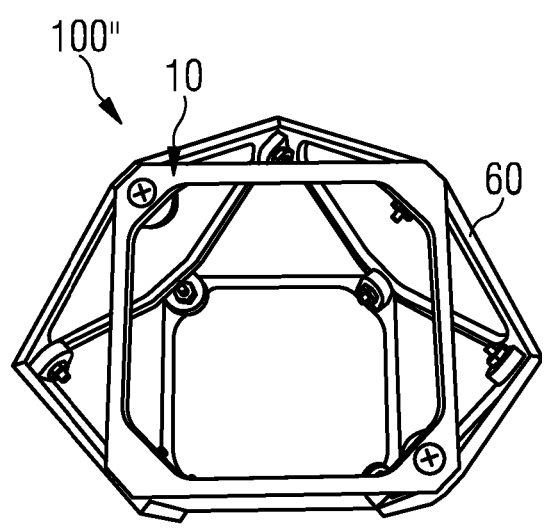

FIGS. 6b and c show lattice voxels 100', 100" with both square elements 10 and triangular elements 60. In particular, FIG. 6b shows a lattice voxel 100' with 2 quadrilateral elements 12' and 4 triangular elements 60 and FIG. 6c shows a lattice voxel 100" with 4 square elements 10 and 2 triangular elements 60. The skilled person understands that these are just exemplary embodiments and that there may be any number of square elements 10 and triangular elements 60 within a lattice voxel 100, 100', 100".

Figure 6D:
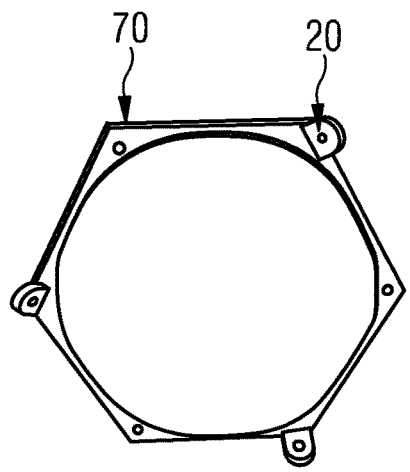

In the embodiment of FIGS. 6d, e and f, instead of triangular elements 60, the lattice voxel 100 comprises octagonal elements 70.

In FIG. 6d, an octagonal element 70 is shown. The central hole of the octagonal element is circular but the outline of the element 70 is an octagon. This may allow for a combination of lightweight element while still maintaining the ability for the octagonal element 70 to couple to other elements within a lattice voxel 100, 102. The octagonal element may comprise connector elements 20 or alternatively, may not comprise connector elements. The central hole may alternatively be triangular, quadrilateral or a bespoke shape.

Figure 6E:
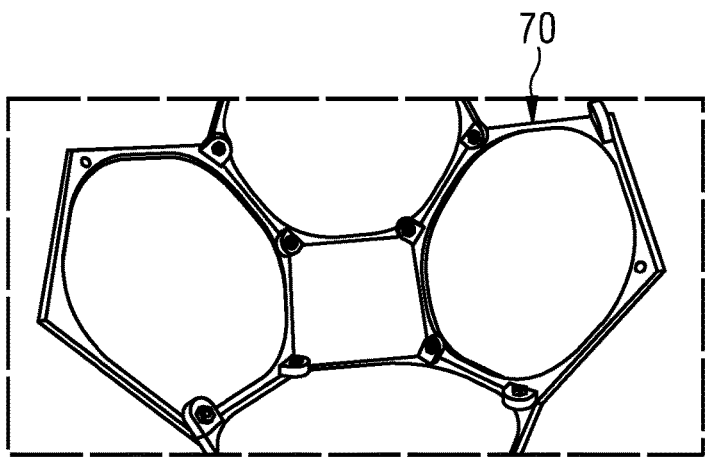

In FIG. 6e, it is shown that the octagonal elements 70 are coupled to a square element 72 via connector elements on both the octagonal elements 70 and the square element 72. The square element 72 may alternatively be another quadrilateral shape, a triangular element, a circular element, or an element of a bespoke shape.

Figure 6F:
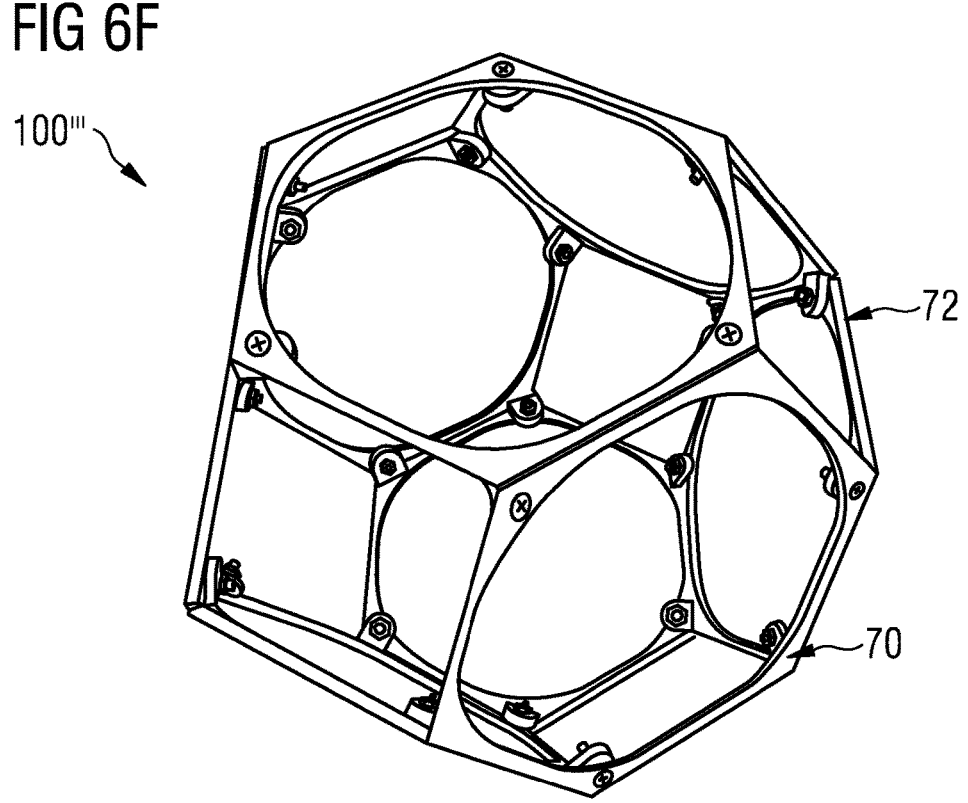

In FIG. 6f, a lattice voxel 100''' constructed using the octagonal elements 70 is shown. In this embodiment, the lattice voxel 100''' a number of octagonal elements 70 and square elements 72 so as to form a "truncated" octahedron. That is to say, one of the vertices of the octahedron has been replaced with a flat surface. In this embodiment, only one vertex has been replaced by a flat surface but any number of vertices may be replaced depending on the application of the multi-mission drone. This may be particularly advantageous in structures where there is a large central voxel and the truncated octahedron voxels are smaller. This may allow for a particularly versatile lattice structure. Furthermore, it may allow for a more versatile lattice structure as the truncated octahedron may be able to be coupled to many other lattice voxels 100, 102 which are of different designs.

Figure 7:
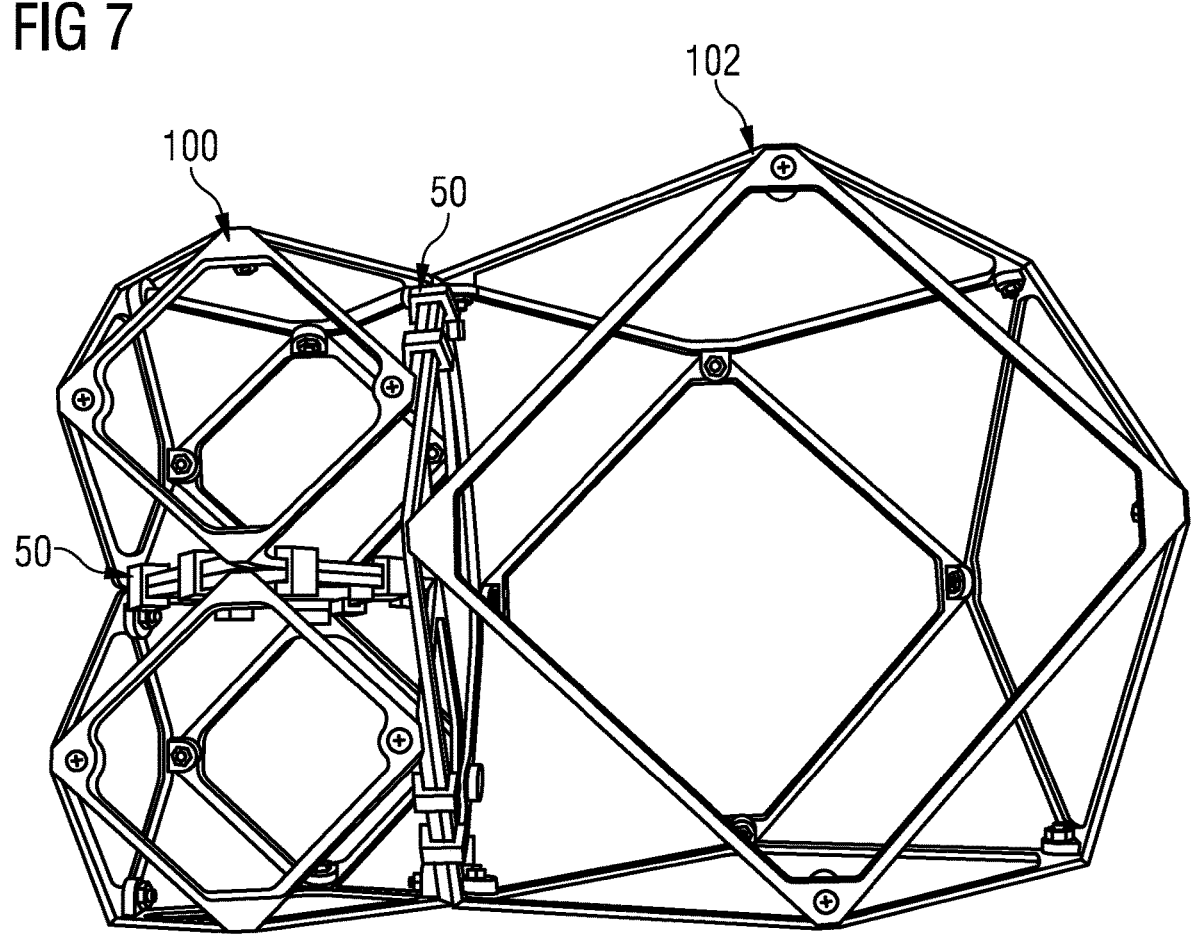

FIG. 7 shows a perspective view of a method of coupling a plurality of lattice voxels according to an embodiment described herein.

FIG. 7 shows how a plurality of lattice voxels 100, 102 can be stacked on top of one another. In order to stack lattice voxels 100, 102, the voxels 100, 102 are preferably scaled with one another. That is to say, in the embodiment of FIG. 7, the diameter of the smaller voxels 100 is half of that of the larger voxel 102. In this embodiment, the smaller voxels 100 are coupled to each other via a plurality of connector brackets 50 but they may also additional be coupled to each other via the connector elements 20 on each smaller voxel 100. These smaller voxels 100 are then coupled to the larger voxel 102 via additional connector brackets 50 and also, if desired, connector elements 20. This may allow for a highly customizable lattice structure which is able to be easily changed based on the parameters of the mission that the drone using the lattice structure is undertaking. The skilled person understands that the lattice voxels 100, 102 may be scaled to any suitable ratio such as, for example, 3:1 or 4:1.

Figure 8A:
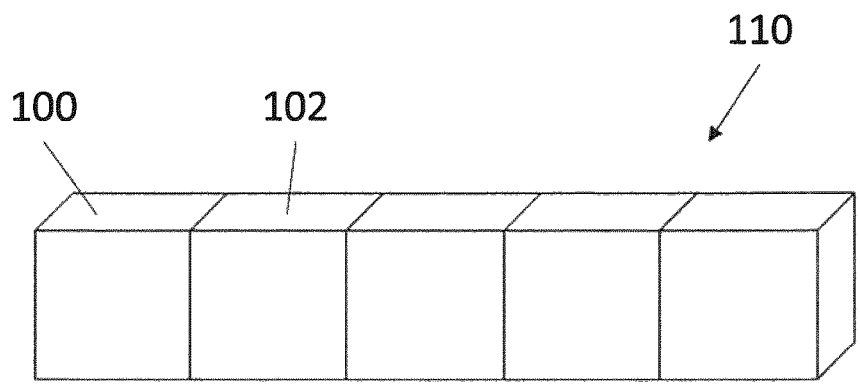
FIG. 8a shows a perspective view of a constructed drone arm according to an embodiment as described herein.

FIG. 8a shows a perspective view of a constructed drone arm according to an embodiment as described herein.

In this embodiment, the lattice voxels 100, 102 are depicted as cubes but they may be of any suitable shape. The lattice voxels 100, 102 are coupled by coupling one or more connector elements 20 from a first lattice voxel 100 to one or more connector elements 20 from on a second lattice voxel 102. The couplings between the lattice voxels 100, 102 may be achieved by the same method as the couplings between the same shape elements 10, 12 described above.

The drone arm 110 is constructed by coupling a plurality of lattice voxels 100, 102 to each other. The drone arm 110 may be of any suitable size.

Figure 8B:
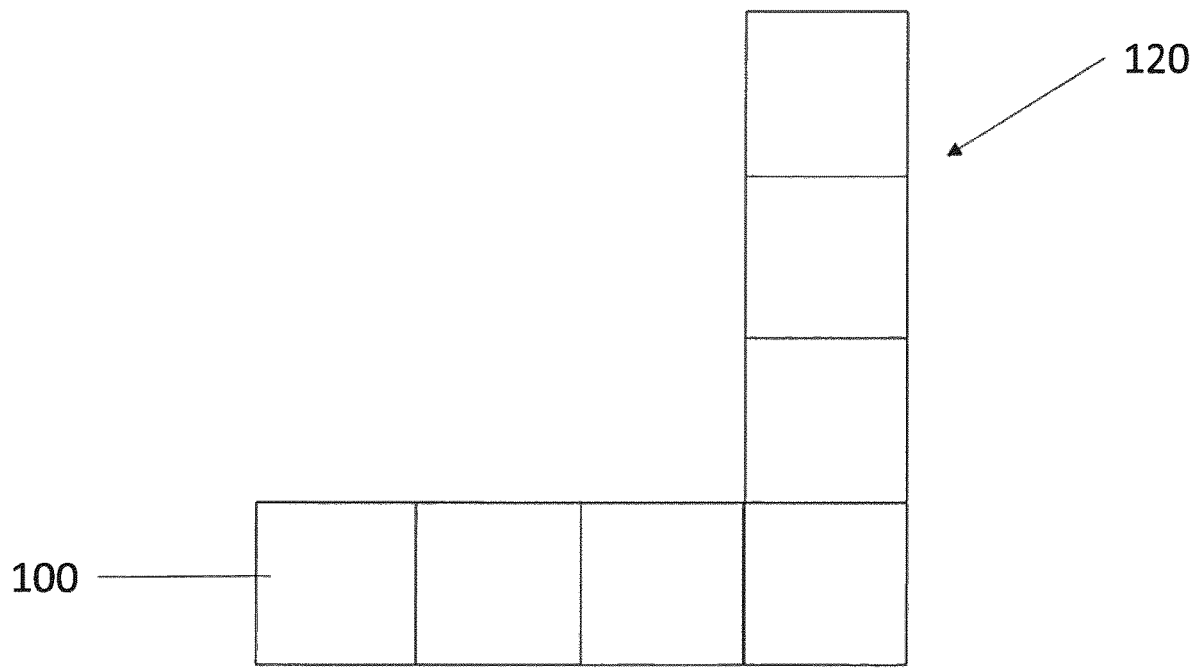
FIG. 8b shows a perspective view of a constructed drone section according to an embodiment as described herein.

FIG. 8b shows a perspective view of a constructed drone section according to an embodiment as described herein.

The drone section 120 is constructed in a similar way as to how the drone arm 110 is constructed. In this embodiment, two drone arms 110 are coupled together by a central lattice voxel 100 to form a L-shape so as to form the drone section 120. The drone section 120 may be of any suitable shape.

Figure 9A:
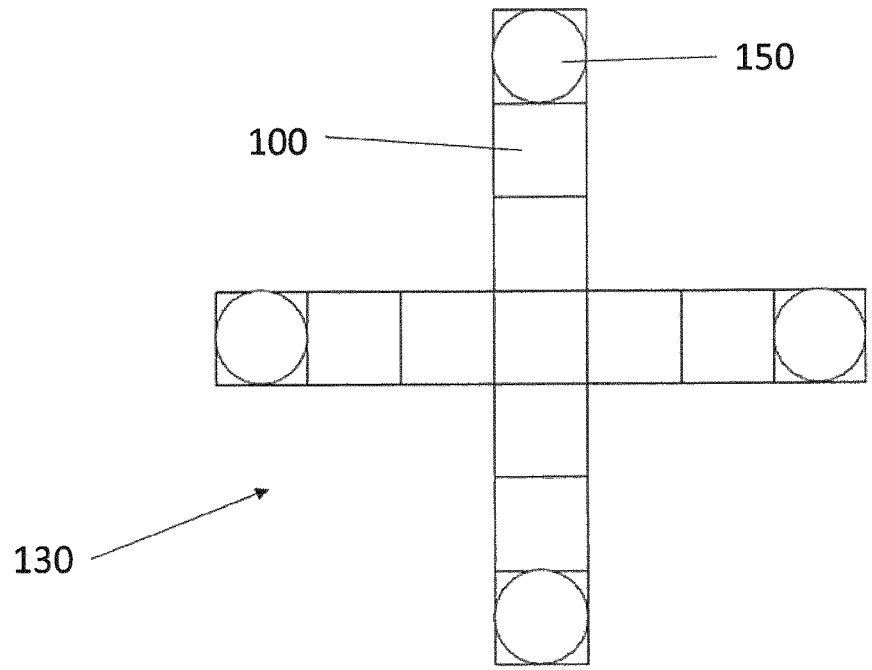
FIGS. 9a and b show constructed drones according to embodiments as described herein.

FIGS. 9a and b show constructed drones according to embodiments as described herein.

FIG. 9a shows a drone 130 constructed by 13 lattice voxels 100 in a cross shape. In this embodiment, the height of the drone is one voxel 100, i.e. voxels 100 are not coupled on top of one another. The drone 130 also comprises a propeller 150 at the end of each arm. The propellers 150 are powered by an onboard system (not shown). The may be any number of propellers 150 coupled to the drone 130. The propellers 150 may be any type of propeller 150 but are preferably carbon propellers 150 powered by a brushless motor. Each brushless motor may power a single propeller 150 or may power a plurality of propellers 150. In some embodiments, one or more propellers may be positioned on the underside of the drone 130, i.e. in a direction substantially towards the ground while the drone 130 is in flight. The design of the drone 130 may be altered by removing and/or adding lattice voxels 100 at suitable places.

Figure 9B:
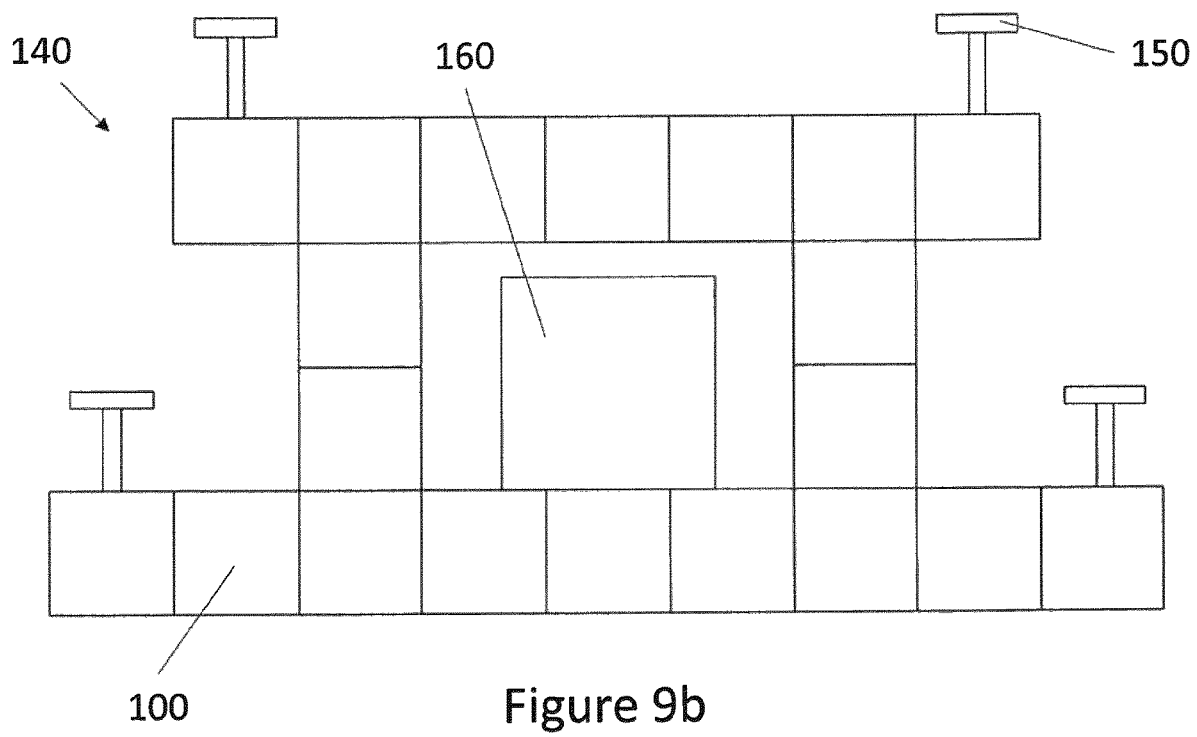

FIG. 9b shows a larger drone 140. In this embodiment, lattice voxels 100 are stacked on top of each other. There are also propellers 150 at the end of each arm of the drone 140. In the center of the drone 140, there is an adaptable system 160. The adaptable system 160 may comprise a battery, for powering onboard components, an additional propulsion system, a cargo, a camera system or any other suitable component. The adaptable system 160 may be adapted by adding and/or removing components based on the mission the drone 140 is undertaking. The battery may be of any capacity but is preferably between 3500 mAh and 6000 mAh. The propulsion system may be any method of propulsion that allows the drone 140 to move. This propulsion system may be in addition to, or an alternative to, the propellers 150 on the drone 140. Any number of lattice voxels 100 may be coupled to the adaptable system 160. The adaptable system 160 may be coupled to the lattice voxels 100 by any suitable coupling means.

Figure 10:
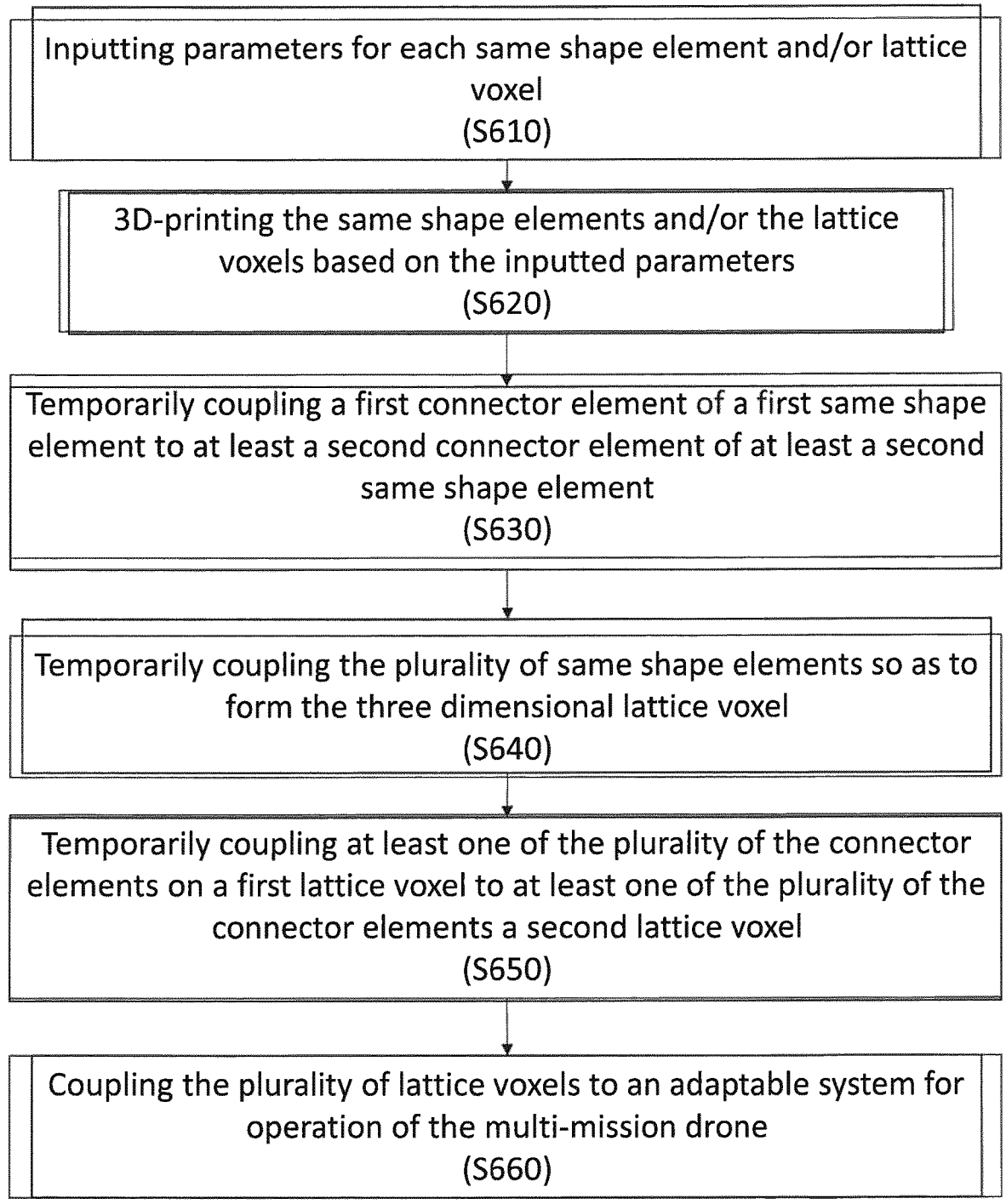
FIG. 10 shows a block diagram of a method of constructing an adaptable lattice structure for a multi-mission drone according to an embodiment as described herein.

FIG. 10 shows a block diagram of a method of constructing an adaptable lattice structure for a multi-mission drone according to an embodiment as described herein.

The construction of the adaptable lattice structure 110, 120, 130, 140 is based on three main steps:

(i) temporarily coupling (S630) a first connector element of a first same shape element to at least a second connector element of at least a second same shape element;

(ii) temporarily coupling (S640) the plurality of same shape elements so as to form a three dimensional lattice voxel; and (iii) temporarily coupling (S650) at least one of the plurality of the connector elements on a first lattice voxel to at least one of the plurality of the connector elements a second lattice voxel.

The method 600 may be undertaken by hand, by 3D-printing, as described in more detail below, or combination of hand and 3D-printing or by any other suitable method.

The temporary coupling of the first 10 and second 12 same shape elements allows for the lattice voxel 100 for which the same shape elements 10, 12 are part of to be taken apart is need be. It may also allow for the size of the lattice voxel 100 to be increased or decreased should more or fewer same shape elements 10, 12 be incorporated into the lattice voxel 100. The temporary coupling is preferably completed by a screw and nut but may be completed by using any suitable temporary coupling means.

After the first 10 and second 12 same shape elements have been temporarily coupled S630, the plurality of same shape elements 10, 12 are then temporarily coupled S640 to form a lattice voxel 100. The temporary coupling may be completed in a similar fashion as the temporary coupling for the first 10 and second 12 same shape elements. The temporary coupling may allow for the size of the lattice voxel 100 to be increased or decreased by adding or removing same shape elements 10, 12. The size of the lattice voxel may be increased or decreased dependent on the parameters of the mission the drone 130, 140 is undertaking.

After constructing the lattice voxel 100, a plurality of voxels 100, 102 are then temporarily coupled S650. This temporary coupling forms a drone arm 110, a drone section 120 or a completed drone 130, 140. The temporary coupling of the lattice voxels 100, 102 allows from the size of the drone 130, 140 to be altered dependent on the mission the drone 130, 140 is undertaking.

In some embodiments, parameters are input S610 to a computer program for each same shape element 10, 12 and/or each lattice voxel 100, 102. These parameters may be a lattice voxel size, a first thickness, a second thickness, a dimension of the plurality of connector elements, a parameter of the plurality of connector elements or any other suitable parameter. In some embodiments, all of the same shape elements 10, 12 and/or lattice voxels 100, 102 have the same parameters. Alternatively, some of the same shape elements 10, 12 and/or lattice voxels 100, 102 may have different parameters. The computer program may be CATIA V5, a visual scripting tool, or any other suitable computer program for altering the parameters. The lattice voxels 100, 102 may be of any size but are preferably between 38 mm and 500 mm in diameter. In some examples, the diameters of lattice voxels in the same adaptable lattice structure are not the same. In a non-limiting example, some voxels may be 100 mm in diameter whereas others are 200 mm in diameter, wherein these voxels are coupled by an adaptor voxel as described above.

In some embodiments, the same shape elements 10, 12 and/or lattice voxels 100, 102 are 3D-printed. This may allow for a particularly fast construction of lattice voxels 100, 102 and therefore, a particularly fast construction of a drone 130, 140. It may also allow for replacement parts to be procured quickly. 3D-printing may also allow for individual elements of the same shape elements 10, 12 to be made of different materials. Alternatively, the same shape elements 10, 12 and/or the lattice voxels 100, 120 may be made in a factory in a mass-produced manner or in any other suitable manner.

Figure 5B:
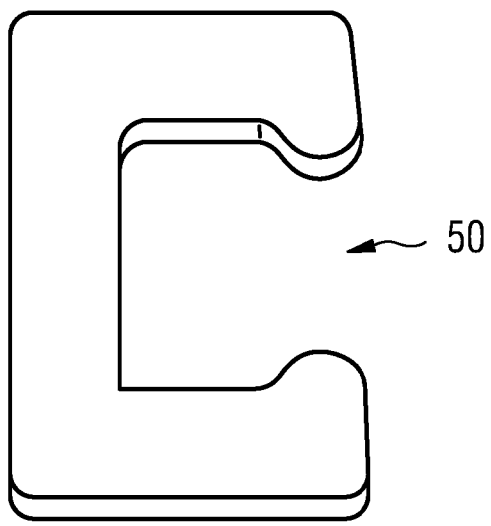

In some embodiments, the completed adaptable lattice structure 110, 120, 130, 140 is then temporarily coupled to an adaptable system 160. This adaptable system 160 may be similar to the adaptable system described above in relation to FIG. 5b.

No doubt many other effective alternatives will occur to the skilled person. It will be understood that the invention is not limited to the described embodiments and en-compasses modifications apparent to those skilled in the art and lying within the scope of the claims appended hereto.

The invention claimed is:

1. An adaptable lattice structure for an Unmanned Aerial System (UAS) comprising:
   a plurality of lattice voxels, wherein each lattice voxel comprises:
   a plurality of same shape elements, wherein the same shape elements are squares;
   wherein each same shape element comprises a plurality of connector elements, wherein the plurality of connector elements is configured to temporarily couple a first same shape element to at least a second same shape element;
   wherein the plurality of same shape elements is configured to be temporarily coupled so as to form a tetradecahedron; and
   wherein at least one of the connector elements on a first lattice voxel is configured to temporarily couple the first lattice voxel to a second lattice voxel after the formation of the first lattice voxel and the second lattice voxel.

2. The adaptable lattice structure of claim 1, wherein the plurality of connector elements on the first same shape element comprise a first at least one connector hole configured to be alignable with a second at least one connector hole on the second same shape element and/or the second lattice voxel.

3. The adaptable lattice structure of claim 1, wherein at least one of the plurality of lattice voxels is configured to be temporarily coupled to an adaptable system for operation of the UAS, wherein the adaptable system comprises at least one of:
   a battery;
   a propulsion system;
   a cargo; and
   a payload.

4. The adaptable lattice structure of claim 1, wherein each of the plurality of same shape elements and/or the plurality of lattice voxels are 3D-printed.

5. The adaptable lattice structure of claim 1, wherein the first same shape element and/or the second same shape element comprises a kink in one or more beams of the said first same shape element and/or second same shape element and/or an adapter element configured to hold an external element.

6. The adaptable lattice structure of claim 1, wherein at least one parameter of the plurality of same shape elements and/or the plurality of lattice voxels is configured to be changed before the manufacture of said plurality of same shape elements and/or plurality of lattice voxels via a computer program, wherein the parameters comprise:
   a lattice voxel size;
   a first thickness;
   a second thickness;
   a dimension of the plurality of connector elements; and
   a parameter of the plurality of connector elements.

7. A UAS comprising the adaptable lattice structure of claim 1.

8. A method for constructing an adaptable lattice structure for an Unmanned Aerial System (UAS):
   wherein the adaptable lattice structure comprises a plurality of lattice voxels, wherein each lattice voxel comprises a plurality of same shape elements, wherein the same shape elements are squares, and wherein each same shape element comprises a plurality of connector elements; wherein the method comprises:
   temporarily coupling a first connector element of a first same shape element to at least a second connector element of at least a second same shape element;
   temporarily coupling the plurality of same shape elements so as to form a tetradecahedron; and
   temporarily coupling at least one of the plurality of the connector elements on a first lattice voxel to at least one of the plurality of the connector elements on a second lattice voxel after the formation of the first lattice voxel and the second lattice voxel.

9. The method of claim 8, wherein the plurality of connector elements on the first same shape element comprise a first at least one connector hole, and wherein the method further comprises aligning a second at least one connector hole on the second same shape element and/or the second lattice voxel with the first at least one connector hole.

10. The method of claim 8, further comprising temporarily coupling at least one of the plurality of lattice voxels to an adaptable system for operation of the UAS, wherein the adaptable system comprises at least one of:
    a battery;
    a propulsion system;
    a cargo; and
    a payload.

11. The method of claim 8, further comprising 3D-printing each of the plurality of same shape elements and/or the plurality of lattice voxels.

12. The method of claim 8, further comprising changing at least one parameter of the plurality of same shape elements and/or the plurality of lattice voxels before the manufacture of said plurality of same shape elements and/or plurality of lattice voxels, wherein the parameters comprise:
    a lattice voxel size;
    a first thickness;
    a second thickness;
    a dimension of the plurality of connector elements; and
    a parameter of the plurality of connector elements.

13. A use of the adaptable lattice structure for a UAS according to claim 1.

14. A use of the UAS according to claim 7.

15. A use of the method for constructing an adaptable lattice structure for a multi-mission drone according to claim 8.

* * * * *